Feb. 25, 1964   A. C. PETERSON   3,121,991
UNIT CHARGER FOR COMBUSTION ENGINES
Original Filed Aug. 19, 1957   4 Sheets-Sheet 1

Fig. 1

INVENTOR.
Adolph C. Peterson.

Feb. 25, 1964   A. C. PETERSON   3,121,991
UNIT CHARGER FOR COMBUSTION ENGINES
Original Filed Aug. 19, 1957   4 Sheets-Sheet 2

INVENTOR.
Adolph C. Peterson.

Feb. 25, 1964 A. C. PETERSON 3,121,991
UNIT CHARGER FOR COMBUSTION ENGINES
Original Filed Aug. 19, 1957 4 Sheets-Sheet 4

INVENTOR.
Adolphe Peterson.

United States Patent Office

3,121,991
Patented Feb. 25, 1964

3,121,991
UNIT CHARGER FOR COMBUSTION ENGINES
Adolphe C. Peterson, 4623 Bruce Ave. S.,
Minneapolis 24, Minn.
Continuation of application Ser. No. 679,050, Aug. 19, 1957. This application Oct. 27, 1960, Ser. No. 65,542
8 Claims. (Cl. 60—13)

My invention relates to means for charging internal combustion engines with fuel especially and also for charging of the engine cylinders with air and also to related means for such engines, and it is therefore called—Unit Charger for Combustion Engines.

The chief objects of my invention are to provide a device which will serve such functions as fuel charging, and air charging in a more efficient and compact means and with less complication and cost in the manufacture than such as is usually involved in the provision of such means for internal combustion engines, and to provide such means in a form which will serve also to provide for such engines the advantages which may be derived from the injection of fuel to individual cylinders or combustion chambers of an engine or to the air stream entering each such individual cylinder or combustion chamber of an engine. A chief object is the provision of a fuel injection means serving a plural number of combustion chambers, which will adequately perform the function of distributing or dividing of the fuel needed for the engine into accurate, similar charges of fuel for each cylinder or combustion chamber. Means for injection of fuel, as usually provided, are very difficult of manufacture to provide accurately measured charge for each combustion chamber of a multiple cylinder engine, especially of the smaller types, and this means is therefore a means intended to provide such accurate and evenly divided distribution of fuel in such engines of the multiple cylinder types. It is an object in connection with this means for distribution of fuel, to provide means included therewith for charging the combustion chambers with air at increased pressure, that is for supercharging, and it is an object also to include in a unit for such purposes, other needed equipment for such engines, especially automotive engines, so that the unit, in toto, provides a more easily manufactured means for all the needed purposes, and also a less costly means for such purposes. In general the object is to provide improved means for the purposes indicated.

This application is a continuation of the prior application of the applicant herein, which prior application is entitled: Application of Adolphe C. Peterson, Ser. No. 679,050, filed August 19, 1957, now abandoned, and bearing title—Unit for Charging Combustion Engines.

The principal devices and combinations of devices comprising my invention are as hereinafter described and as defined in the claims. In the accompanying drawings which illustrate my invention in several forms, like characters refer to like parts throughout the views. Referring to the drawings:

FIGURES 5, 6, 7, 8, 9, 10 are views of the modified form of my device, and of these figures, 5 is a vertical section on lines 5—5 of FIGURES 6 and 7, some parts in side elevation; 6 is a horizontal section on line 6—6 of FIGURE 5 looking upwardly; 7 is a horizontal section on line 7—7 of FIGURE 5 looking downwardly; FIGURE 8 is the electric circuit in diagram; FIGURE 9 is a side elevation of a detail, the metering plug; FIGURE 10 is a section of the detail shown in FIGURE 9; FIGURES 9 and 10 being on an enlarged scale, FIGURES 6 and 7 being on a scale approximately one-half that of FIGURE 5. The scale of FIGURE 3 is one-half that of FIGURES 1 and 2.

FIGURES 11, 12, 13, are on much reduced scale.

Referring first to FIGURES 1, 2, 3, 4, included as the chief operating element or unit is a vertically mounted shaft 1 which has fixed on it to rotate with it, designated from top to bottom; governor arms 2, electric generator (and motor) armature 3, centrifugal super-charging compressor (or blower) 4, exhaust driven radially inward flowing turbine 5, carrier air compressor 6 and centrifugal fuel discharger 7.

Figure 1:
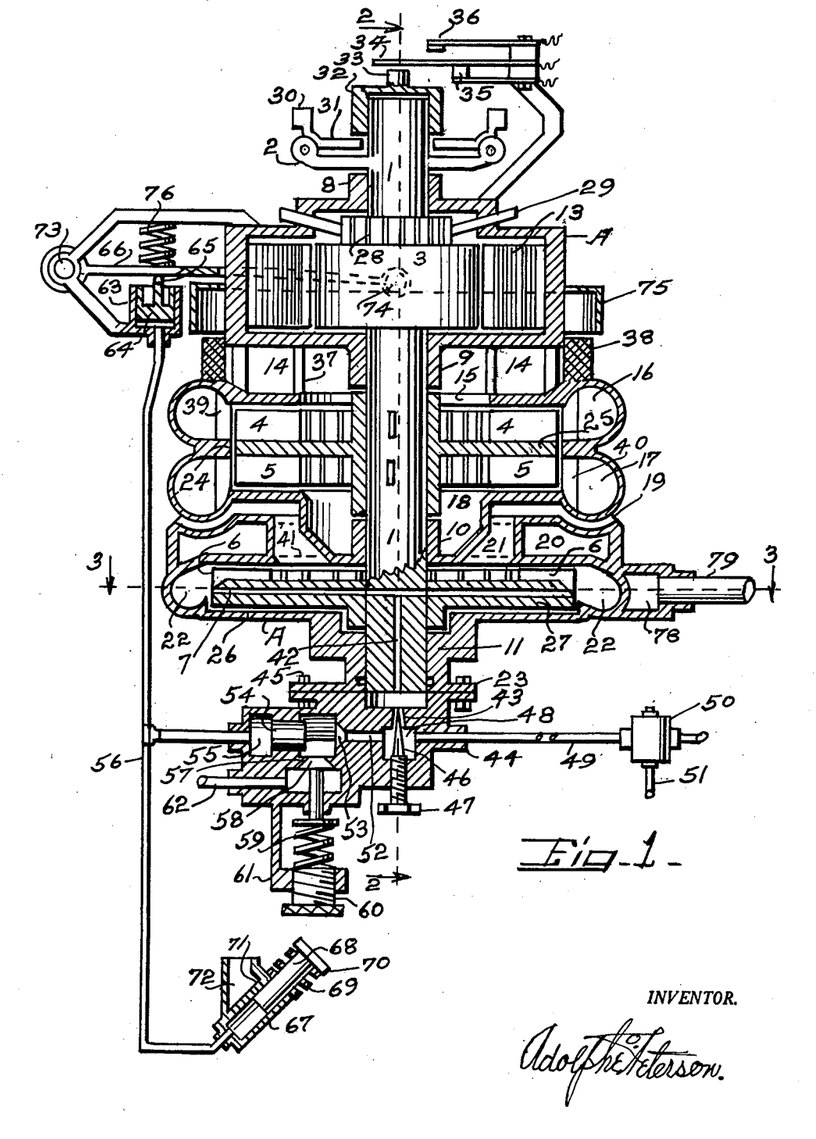
FIGURE 1 is a view chiefly in vertical section on a plane passing through the axis of the principal operating elements of my device, some parts in vertical side elevation, some parts broken away, the section being on the lines 1—1 of FIGURES 2, 3.
Figures 2, 3, 4:
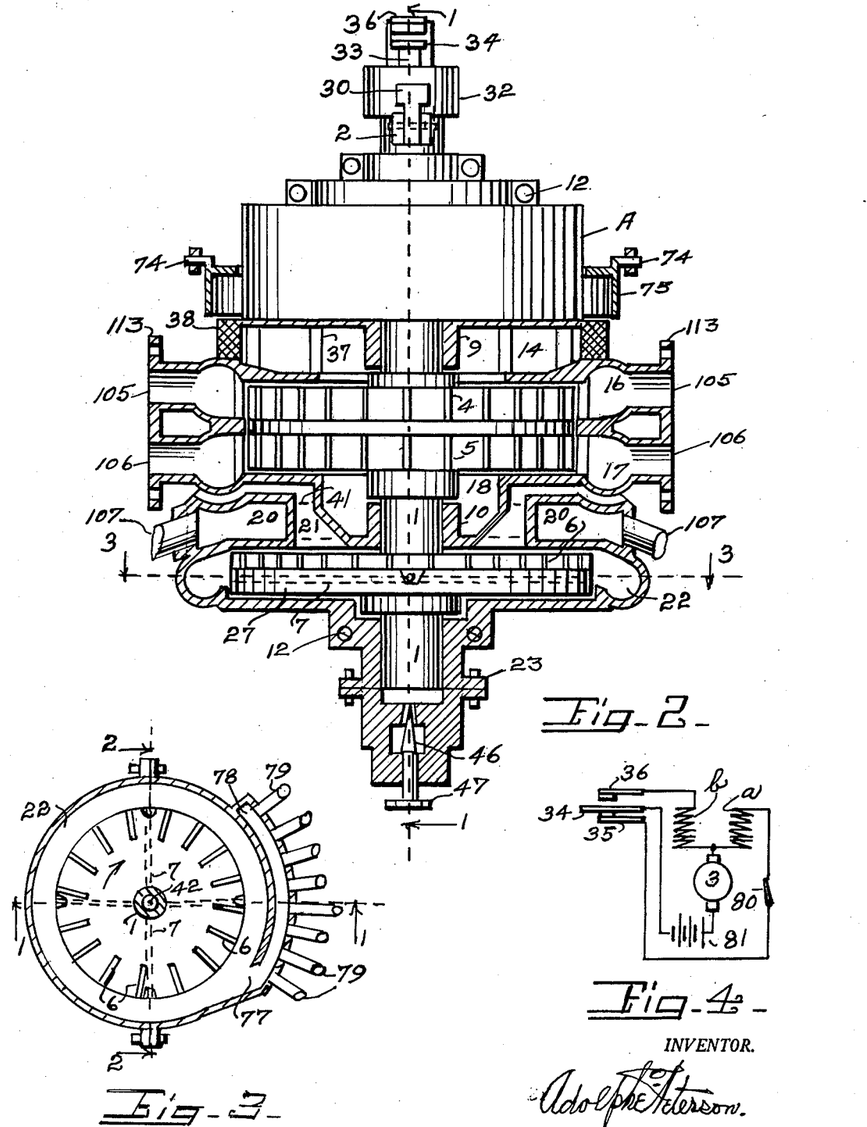
FIGURE 2 is a view chiefly in vertical section, some parts in vertical side elevation, some broken away, the section being on the lines 2—2 of FIGURES 1 and 3.
FIGURE 3 is a view in horizontal section on the lines 3—3 of FIGURES 1 and 2, showing the rotor element chiefly in plan view, showing individual fuel distributing lines broken away.
FIGURE 4 is a diagrammatic view of the electric circuit included in the means.

The shaft 1 is rotatably mounted in the bearings 8, 9, 10, 11, all of which are either formed in or in any manner mounted in a casing generally designated as A and which may be formed as a two part unit divided vertically on the line 2—2 of FIGURES 1 and 3, and assembled together by means of bolts 12 to form a firm casing wherein the shaft 1 and its elements, as above designated, may rotate together as a unit, the governor arms 2 being however rotatable above and outside of the casing as formed.

The casing A has formed in it, from top to bottom, the generator (motor) fields 13, the air intake passage 14 of annular form, the annular compressor intake port 15, the annular air diffusion chamber 16, the annular exhaust gas nozzle chamber 17, the exhaust gas outlet port 18, the supplemental or carrier air intake 19, the annular exhaust gas chamber 20, the interposed carrier air passages 21 for air heating and discharge of carrier air to the carrier air compressor, the carrier air diffuser chamber 22, the flange 23 for mounting of a fuel control means. There is one cylindrical chamber, designated 24, formed in the casing for rotation of the compressor 4 and turbine 5 which are formed as a unit, air compressor on one side and turbine blades 5 on the other side of an intermediate disk-like rotor 25. There is another cylindrical chamber, designated 26, formed in the casing for rotation of the compressor 6 and fuel discharger 7 which are a unit formed in the disk-shaped rotor 27. The cylindrical chambers designated 24 and 26 and the others are formed to be in cooperation, as hereinafter described.

The armature 3 has a commutator 28, and there are commutator brushes 29 mounted in the casing described above. The governor arms 2 pivotably mount the centrifugally movable weight arms 30 which each have attached the radially extended arms 31 which are adapted to engage upwardly the lower end of a vertically slidable sleeve 32 which is slidable on the upward end of the shaft 1 and when upwardly moved engages by its extension 33 the contact spring 34, the latter when in the downward position forming contact with a contact 35, and when in the upward position breaking contact with contact 35 and engaging the contact spring 36.

The air intake passage 14 is formed to have entry of air at substantially its entire periphery, columns 37 forming part of the casing halves or sections above described and securing the upper and lower parts of the casing but providing intermediate air entry passage, which air entry passage 14 is surrounded by a wire or other type air screen 38 through which atmospheric air may enter being screened in passage. The air diffusion chamber 16 has formed in it the diffusion blades or nozzle forming elements 39. The exhaust gas nozzle chamber 17 has nozzle forming blades 40 formed therein to direct incoming exhaust gases into the blades of the turbine 5 uniformly in a direction to procure very rapid rotation of the turbine 5 and thereby shaft 1 and its carrier rotor means. The interposed carrier air passages 21 are formed and located intermediately of the passages 41 for passage of exhaust gases from the turbine so that the incoming carrier air passing to the carrier air compressor is somewhat heated so that it will form a better disperser and carrier for the fuel discharged into the carrier air. The carrier air compressor is illustrated as receiving air through the intake 19. It should be understood that this illustration of the intake means merely shows one means of receiving such air and that the carrier air for compression by carrier air compressor 6 may be received in any manner as by any means passing air from the diffuser chamber 16. Passage of air from one blower to another for higher compression is well known and any such means may be adopted for use in this device for the higher compression of the carrier air rather than by such means as shown namely the use of the larger diameter compressor rotor 6.

The carrier air compressor 6 is somewhat larger in diameter than the scavenger or charging air compressor 4 so that carrier air has a slightly higher compression pressure than the super-charging air, but this higher pressure may exceed the pressure of the super-charging air by only a few pounds, enough so that adequate carriage of the fuel and dispersion of it is procured. The centrifugal fuel discharger 7 is formed of very carefully restricted or defined cross-sectional area, so that the fuel as discharged centrifugally by the fuel discharger 7 is thereby of a constant quantity which is determined at any instant of time by the cross sectional area or metering volumetric capacity of the discharger or passages 7 and the rotational speed of the rotor 27, wherein the discharger passages 7 are formed, and also the combined effect of the fuel control means which is hereinafter described, so that a controlled fuel discharge per unit of time is procured and so that the fuel flow is proportionate to the air flow generally as hereinafter more particularly described.

The fuel discharger 7 (passages 7) receives fuel from the axially placed bore or passages 42 in the extreme lower end of shaft 1, and that passage receives fuel through a metering passage 43 formed in the control unit 44 which is attached by bolts 45 to the lower end of the casing 1. The metering passage 43 may be adjusted as to its area by the needle valve 46 which is adjustable manually by hand wheel 47. The metering passage 43 receives fuel by chamber 48 from pump supply pipe 49 and thereby from the fuel pump 50 which may be a fuel pump operated by the rotating shaft 51 by any means as by the engine crank shaft or any accessory shafts, or it may even be operated by any electric motor means, as such fuel supply means are usually operated and it may have a predetermined volumetric flow according to the speed of rotation of the engine crank shaft, and it may supply fuel at any predetermined or adequate pressure which pressure may be such and the fuel pump may be of such capacity, that it may range from a low pressure to any adequate pressure for full power, as from twenty to a hundred pounds to even one thousand pounds or more, such pressure depending on the construction and proportioning of parts, and upon the design of the associated engine for use with the device.

The chamber 48 may release or by-pass fuel by means of a by-pass port 52 controlled by a by-pass valve 53, and the latter is controlled and normally closed or partially and intermittently closed, by an inter-connected pressure responsive plunger 54 which is subjected to pressure in the chamber 55 from a control fluid pipe 56. The chamber 55 includes for description the chambers on either side of the plunger 54 and also the cylinder wherein the plunger is reciprocable, and the inward end of this chamber, that open by the by-pass valve, to the chamber 48, may discharge through a supplemental by-pass port 57, controlled by by-pass valve 58, as the latter is controlled by the pressure of a coil spring 59 whose pressure is adjustable by adjusting element 60, the latter being adjustable in its bracket 61. The pressure of the coil spring 59 is contemplated to be adjustable to provide only that pressure of fuel flow to the discharger 7, as will result in flow sufficient for engine idling, any excess pressure in or to the by-pass port 57 being dischargeable thereby to the by-pass return pipe 62 for return to the fuel supply.

The control fluid pipe 56 has one branch connected with the chamber 55 on the side of plunger 54 opposite to that of the by-pass valve 58 and by-pass valve 53, and has one branch connected with the head end of the cylinder 63 wherein is reciprocable a pressure responsive piston or plunger 64 which by the extension 65 contacts a throttle lever 66, and it has another branch connected with the plunger cylinder 67 wherein is reciprocable the manually operable control piston or plunger 68, the latter being normally liftable outwardly of the cylinder 67 by coil spring 69 and depressable into the cylinder 67 by manual pressure, as by foot or hand, on the pedal member 70. The plunger cylinder 67 and pipe 56 and all its branches are filled with a liquid such as lubricating oil of low viscosity, and when the plunger 68 is permitted to rise to its fullest height, upwardly, oil may flow through port 71 from reservoir 72, if the cylinder 67 is not full. This manual control plunger and its cylinder are shown only as illustrative of such means, as it may be constructed in any manner and especially in accordance with the design of such means as has been shown by the applicant in his patent numbered 2,522,890.

The throttle valve lever 66 is fulcrumed at 73 and pivotally mounted at the opposite end by the pivots 74 on the so-called throttle collar 75, the latter being a collar shaped throttle valve, mounted exteriorly of the casing structure above described, and slidable vertically to move downwardly to be located around the exterior surface of the screen to thereby partially or nearly completely or completely shut off entry of atmospheric air through the screen 38 and to move upwardly under pressure effect of the control fluid in pipe 56 on plunger 64 to open the exterior side of the screen to atmospheric air so that atmospheric air may enter into the screen and thereby to the super-charging air compressor. The coil spring 76 normally depresses the throttle collar 75 to partially or completely close the screen to atmospheric air.

The carrier air diffusion chamber 22 is annular in form and has discharge from it by a connecting passage 77 (see FIG. 3) to a diverse channel 78 formed in the casing 1 at one side of the casing structure, and this channel 78 is closed except by the passage 77 and the open ends of diversion or distribution pipes 79 there being 8 of the latter as shown, that is one for each cylinder or intake passage of the associated engine structure (as in FIGURES 11 and 12) and each of these distribution pipes 79 will be capable of permitting flow to one injection plug as hereinafter described, in association with the intake structure of an associated engine. The diversion channel 78 (FIGURES 1–3) is formed in the rotor casing adjacent diffuser channels 22 to have generally a direction from passage 77 such as to divert flow of carrier air and fuel oppositely to the rotational direction of air and fuel flow in the chamber 22, and the rotation of shaft 1 and rotor 27 is contemplated to be according to the arrow (FIGURE 3) so that the air and fuel in chamber 22 will be carried generally in the same direction rotationally as it emerges from the rotor 27 as air and fuel mixture and thus the result is that any heavier or larger particles of fuel will generally be carried around with the air past the connecting passage so that such larger particles will have time to be evaporated or diffused, so that then only finely diffused fuel will enter the diversion channel 78 with the carrier air. It is contemplated that fuel atomization and vaporization, effected by the spraying of fuel from metering passages 7 (discharger) and impact of compressed air on the fuel in chamber 22, as discharged by the compressor, will be so effective in dispersing and diffusing the fuel in the compressed air, that the diversion channel and backward flow of fuel therein, will generally be only an added protective measure to secure adequate distribution of the fuel charge to the air charge.

The motor-generator unit 3, as in the diagram FIGURE 4, has two field windings $a$ and $b$, and one of these, that connected with contact spring 35 is adapted for use as a starting motor and accelerator or aiding motor, and the other is connected with contact 36 and is adapted to be used for operation of the motor generator as a generator for battery charging. The means of conversion of the motor for usage as a generator charging a battery is well known and this means is only shown as one such means, any means as commonly used being adaptable for such use. In this form of my device, the governor means and contact spring means and contacts, at the top of FIGURES 1 and 2, are arranged for use at the lower and upper extremes of the range of speed of shaft 1 so that the motor-generator unit 3 will operate as a motor in the starting phase and as necessary in the idling phase, and so that the usage of the motor-generator unit 3, as a generator, will occur in the upper range of speed of shaft 1, so that at such upper range speed the shaft 1 will generally be kept from exceeding the predetermined maximum speed, although the high range should permit some range of speed so that battery charging may be practicable with motor-generator unit 3. Conversely in the low range of speed when there is contact with contacts 35, the usage as a motor of motor-generator unit 3, will cause the shaft 1 to be kept in such adequate speed of rotation, so that idling distribution of fuel is effected.

The shaft 1 and its rotors will have a speed of rotation which will generally tend to be in proportion to the power output of the associated engine, since exhaust gas discharge from such engine will be generally in proportion to the power output of the engine, and this will proportionately deliver driving power to the turbine 5. The result of this is that super-charging air is in proportion to such speed of the rotors described and also that carrier air is in proportion, and also that fuel delivery to the carrier air is in proportion approximately since the rotational speed and centrifugal thrust upon the fuel in discharge passages 7 is substantially in proportion. However, all of this is under the control of the driver or operator by means of his control of the plunger 68 whereby he increases or decreases the pressure of control fluid in conduit 56 and thereby similarly increases or decreases the pressure of control fluid upon the throttle control plunger 64 and upon the fuel control plunger 54, the former by increasing pressure in pipe 56 raising throttle collar 75 and increasing flow of air, and the latter by increasing pressure on the by-pass fuel valve 53 throttling the release or by-passing of fuel so that more fuel flows into the discharger 7 and to chamber 22, conversely with decreasing pressure in pipe 56, the fuel pressure to discharger 7 is diminished and the air and the air flow to the supercharger is diminished.

The elements 50, 46, 53, 48, FIGURE 1, and associated means are a means for supplemental control of fuel flow but it should be noted that flow of fuel may in considerable part and in some constructions largely be controlled by the rotational speed and centrifugal pressure caused by such rotation, so that fuel flow and fuel intermixing with air is thus at least in part proportioned to air flow by the rotational speed of the fuel discharger 7 and the air compressor rotor 6.

Figure 11:
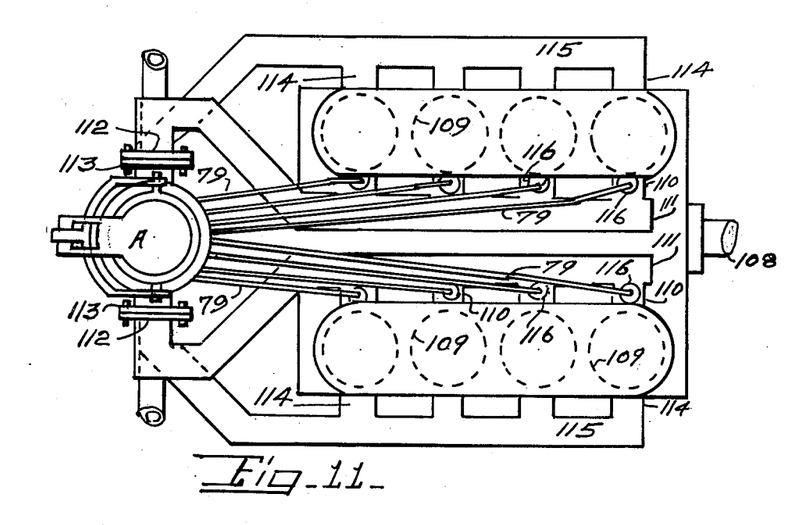
FIGURE 11 diagrammatically shows the unit applied to an eight cylinder four cycle engine.
Figures 12, 13:
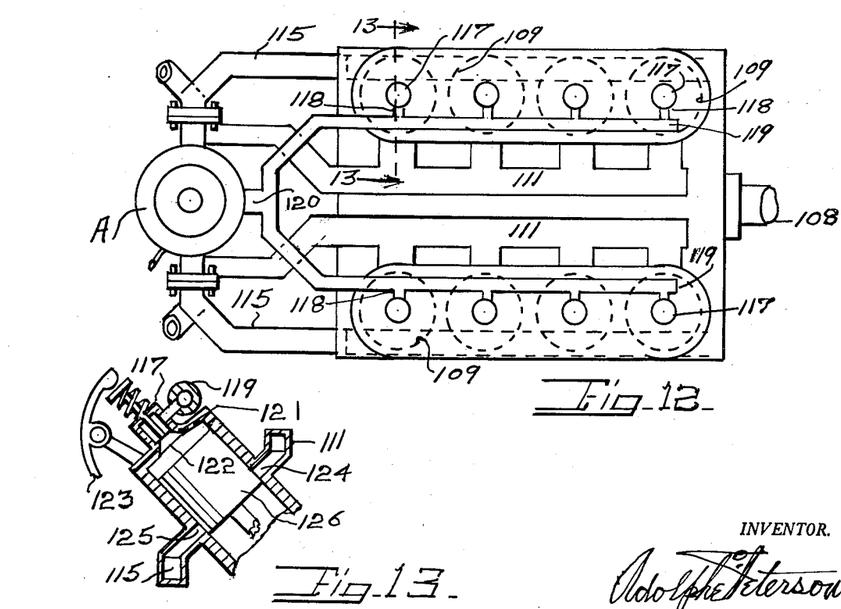
FIGURE 12 diagrammatically shows the unit applied to an eight cylinder V type two cycle engine.
FIGURE 13 is a detail section on line 13—13 of FIGURE 12.

In use of the device in association with an engine, the operator first closes switch 80 and thereupon current from battery 81 flows to motor-generator unit 3 and this latter unit starts rotation of shaft 1 and the rotors commence rotation and thereupon air is drawn through the intake air passage 19 to the carrier air compressor 6 and fuel is discharged by atomization from the fuel discharger 7 as rotor 27 rotates, and the mixed fuel and air passes by way of chamber 22 and diversion channel 78 and distributing pipes 79 to the injectors shown in FIGURES 11, 12, and this carrier air is sufficient generally for idling combustion of fuel although there may be some air added for idling combustion, as for starting and idling there may be some pressure in pipe 56 to procure some lifting of the throttle collar and thereby permit some air to enter the supercharger for air. The associated engine is contemplated to have been simultaneously started by its starting motor, not shown, and the engine will then induct the carrier air and fuel and perhaps some supercharger air and idling or normal operation of the engine will ensue. In normal operation, the power output will be determined by the control pressure in pipe 56 as effected by the operator, and there may be any degree of opening of the screen 38 by means of the lifting of throttle collar 75 and any degree of closing of the main by-pass valve 53. The supplemental by-pass valve is normally uncontrolled manually and only controlled by adjustment of the supplemental by-pass pressure for proper idling fuel delivery. It is contemplated that there may be some small entry of air for the supercharger for air by looseness of the fit of the throttle collar 75, and this will be determined by the construction. Another throttling valve means may be used in place of the throttle collar 75 this being one form for such use as readily incorporated with the casing structure shown. The commonly used form of manifold throttle may in any way be incorporated with the structure. Only the carrier air receives heat from the exhaust gas of the associated engine, and this is proportioned to be only such as is sufficient for adequate assistance in fuel dispersion in the carrier air and not in excess of that degree of heat absorption so that efficiency in use of the engine will not be impaired.

Referring now to the modified form of my device which is shown in FIGURES 5, 6, 7, 8, 9, 10, this form is in general similar to the form as first described, but this form has two major differences, one of which is that the electric motor-generator control by the governor operates somewhat differently and has an increased functional control of the apparatus, and another is, that the control of the fuel flow is not as largely dependent on the pressure effected by the manual control means on the by-pass valves or means, and is rather dependent on the proportional speeds of rotation of the rotors as controlled and also effected by the motor-generator unit 3. Another more minor difference is that the carrier air and fuel distribution to the pipes 79 is directly from the diffusion chamber 22 and not indirectly by way of the diversion channel 78. Another minor difference is that the idling supply of fuel is partly dependent on the separate inductance of idling fuel by an idling fuel nozzle means.

Figures 5, 6, 7, 8, 9, 10:
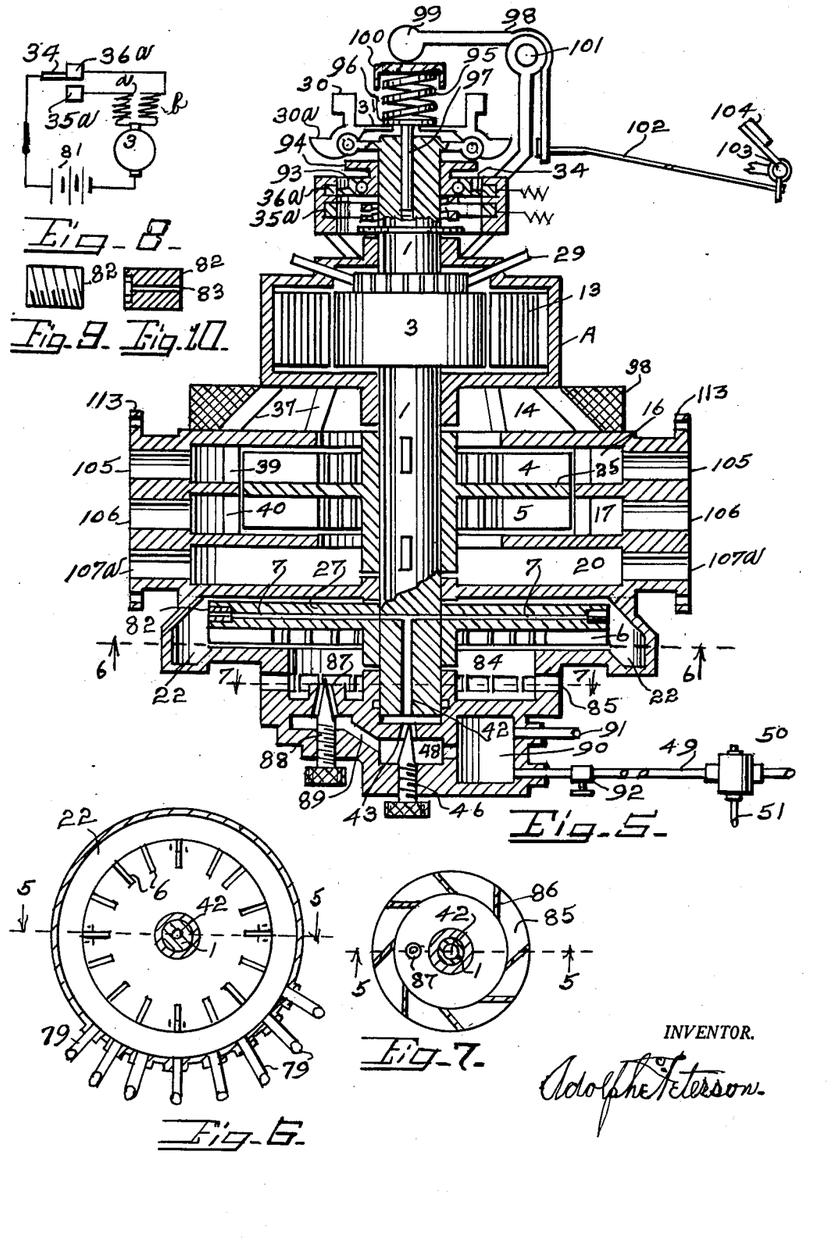

In this modified form the super-charging rotor and the exhaust gas turbine are substantially similar to those elements of the first form and operate similarly. The supplemental or carrier air compressor rotor is substantially similar having the fuel discharger 7 and the air compressor 6, but the fuel discharger is shown to have a fuel metering plug 82 inserted into the rotor disk 27 at the end of each fuel discharger passage or nozzle, this plug having a metering passage 83 formed therein and being screw threaded externally to be tightly screwed into a threaded cavity therefor formed in the rotor disk 27. This plug 82 permits of varying the fuel discharging capacity of the fuel discharger by use of metering plugs 82 with varying capacity fuel metering passages 83 formed therein.

The rotor disk 27 is in this case inverted so that the compressor 6 is on the lower side and this compressor, of centrifugal type, draws air from the radially central chamber 84 by way of air directing nozzles 85 separated by nozzle blades 86 so that air inducted thereby is given a spiraling movement in the chamber 84 and this spiraling movement of the aid serves to aid in circulating and disseminating fuel from the idling nozzle 87, which idling nozzle is adjustable by means of needle valve 88 for change of the flow of fuel for idling use from nozzle 87. The compressor rotor 6 is proportioned to have a capacity for inducting air approximately sufficient for the idling of an associated engine. The axial passage 42 is as in the first form and receives fuel by way of metering passage 43 which is adjustable by means of needle valve 46 and metering passage 43 receives fuel from the chamber 48 which in turn receives fuel from pump supply pipe 49 and thereby from pump 50 which may be operated by its rotating shaft 51 by any means as by the engine crank shaft or any accessory shaft, or it may be operated by any electric motor means as such fuel supply means are commonly operated and it may have a predetermined volumetric flow according to the speed of rotation of the engine crank shaft associated, and it may supply fuel at any predetermined pressure or adequate pressure, which pressure may be determined by any means incorporated with the pump 50 and the pressure may range from a low pressure to any adequate pressure for full powers and that pressure may range in constructions from a few pounds pressure to even as much as one thousand pounds or more depending on the particular construction and its needs and upon the proportioning of parts. The chamber 48 may pass some fuel by passage 89 to the idling nozzle 87, and chamber 48 receives fuel from a reservoir 90 which is interposed between chamber 48 and fuel supply pipe 49. The reservoir 90 may have overflow of fuel by means of overflow pipe 91 which returns fuel to the fuel supply tank (not shown). The fuel pressure from the pump 50 would preferably in this form be rather low and the fuel pump capacity should be at least sufficient for supply of fuel for maximum usage in combustion, in the associated engine, of the maximum super-charging volume of air. A hand valve 92 permits shut off of the fuel supply. It should be noted that in this form the fuel pump 50 could be eliminated and the fuel would then be drawn from the fuel supply pipe merely by the suction of the fuel discharger 7 induced by the rotation of the compressor rotor disk 27.

The distributing pipes 79, which may be of any suitable metal or of any suitable flexible plastic or rubber material, are placed directly in the side wall of the annular diffusion chamber 22 of the carrier air compressor so that each pipe 79 may receive carrier air with the fuel directly from chamber 22 wherein the carrier air carried fuel, evaporated or atomized, will circulate continuously and at a very rapid rate of circulation, so as to thereby provide a very evenly distributed and uniformly constituted mass of carrier air and fuel.

The motor generator unit 3 has the two field windings as in the first form, one adapted for starting or acceleration of the armature 3 and the connected rotors and one adapted for adequate current generation by armature 3, and in this form a so-called primary contact 34 is formed with the outer race of a bearing 93 mounted on a sleeve 94 the latter being axially slidable vertically on the upper end of shaft 1. The contact 34 may contact 36a when the governor is at a low speed position and may contact the contact 35a when the governor is at a high speed position. The contacts 35a and 36a extend in a circle around the contact 34 which is also circular that is as a flange around the bearing 93 (outer race). The so-called high and low speed positions of the governor (in this form) are a variable low or high speed position, that is the speed of rotation at which there is the low or high speed determination by the governor is variable by means of variable pressure from the coil spring 95 which bears downwardly upon the governor arms 31, by means of a disk 96 fixed on the upper end of pin 97 placed in the bore around it formed in the upper end of shaft 1, the pin 97 being slidable vertically in that bore. The pressure of the spring 95 is variable in its pressure by means of a control lever 98 which has a ball 99 formed on one end to bear downwardly upon the top end of sleeve 100 which has a disk formed with it as shown. The control lever 98 is fulcrumed at 101 and may be caused to increase pressure downwardly on coil spring 95 by means of a flexible rod or cable 102 which at its opposite end is attached to one end of a pedal or manual lever which latter is fulcrumed at 103 and is designated 104. This control lever or pedal 104 is only diagrammatically shown and may be any such pedal or hand lever as is customarily used in automotive vehicles for control of a throttle.

The result of the variable form of pressure effect on the governor control of the contact 34 is that the low speed and high speed contact determinations and effects may be changed to make such contacts occur at a higher speed range relatively and therefore the operator or driver may control the speed range motor starter or acceleration effect, form low speed contact with contact 36a to occur at a progressively higher speed of shaft 1, and such manual control will cause the contact with contact 35a to occur at a progressively higher speed which is also higher than the speed at which contact is made with contact 36a, so that he may thus control the speed of shaft 1, providing acceleration, when such speed is below controlled selection of speed, and providing retardation of shaft 1 by the generator effect of motor generator unit 3 to thus maintain a controlled and selected but variable speed of shaft 1, upwardly or downwardly in the speed range. The generator field in this form should be of such capacity that a sufficient retardation effect will be obtained to prevent any substantial excess of speed over the selected control speed, at any time. Cams 30a on weight arms 30 contact sleeve 94.

By variation of the control speed of shaft 1, the operator thus varies the speed range and controls the speed of the super-charging compressor rotor and also the speed of the carrier air compressor 6, and likewise the speed of the fuel discharger 7, so that super-charging air and carrier air and fuel discharging into chamber 22 are all thus subject to variation according to the controlled speed of the shaft 1. In that control the discharge of exhaust gas from the associated engine to the turbine will vary according to the fuel and air supply to such engine as combustion and power will vary accordingly and this variation of exhaust gas discharge effect will serve to aid the control effect afforded by the control according to speed of the motor and generator unit as stated. The nozzle valve 46 is adjustable to permit an additional control of the volume of fuel delivery by the fuel discharger 7 according to the control speed as manually controlled, this needle valve 46 being used to effect a general adjustment of fuel control when that is needed.

The speed control by motor-generator unit 3 of the first described form and by the same means of the form shown in FIGURE 5, is broadly the same in each form in that there is a speed range which has a minimum speed limit which results in motor starting or acceleration effect when the speed limit is not attained, and in that there is a maximum speed limit which results in current generation when that speed limit is exceeded. The effects of this speed range control is in such manner similar in both forms but in the modified form of FIGURE 5, there is an added feature in that the actual speed rotations at which there is either effect may be modified to higher rotative speeds.

In the one form for example, the lower speed limit may be two thousand rotations per minute, and the upper speed limit may be say 30,000 rotations per minute and they will not be changed by manual control in operation. In the other form there are similar speed limits but such limits may be moved up or down in numbers of rotations. For example the operator may by manually operated lever 104 wish to increase power output of an associated engine and he then by the lever 104 increases pressure on spring 95 and that will change what may have been an original range of say 2000 to 4000 rotations per minute to a higher range of say 6000 to 8000 or to an even higher range of say 28000 to 30000 or any intermediate speed range.

In the form of FIGURES 1-2 there is a much wider but permanent range, say 2000 to 30000 or about 28000. In the form of FIGURE 5, the speed limits for automatic governor control may be only say about 2000 rotations apart but such rotation limits may be altered by control manually to be say 2000 to 4000 rotations at the lowermost control range, while they may be altered to be at any speeds 2000 rotations apart up to maximum limits of say 28000 to 30000 rotations per minute at the uppermost control range. In the first form the operator may by air and fuel throttle controls cause change between the limits of 2000 to 30000. In the second form the operator may by the lever 104 cause the upward or downward change of limits range and such limits may be 28000 to 30000 or may be say lows of 4000 to 6000, there being however a range also automatically governor controlled which permits range of say 2000 or such as is found necessary.

In the one form, generally stated, there are low and maximum limits of speed automatically controlled or determined by the governor means and the operator by throttle controls may cause such change of charging of the associated engine, that modification of the speed of shaft 1 and its rotors is thereby attained between the maximum and minimum limits. In the other form there are similarly low and maximum limits of speed which are automatically controlled but the operator or pilot may move such limits between the practicable operative limits of speed so that thereby he may control the charging output by the charging unit and thus control the associated engine.

The motor-generator unit 3 is designed and constructed to be effective as described as a motor so that at the minimum governor controlled speed there is enough torque to keep the rotation speed just above or about the minimum; and it is designed and constructed to be effective as a generator at the maximum automatically governor controlled speed, so that there is sufficient electric current generation to be sufficiently retarding in effect upon shaft 1 so that speed will not greatly exceed the maximum automatically governor controlled speed. Within the automatically governor controlled speed of shaft 1 of the turbo-compressor, the movement of the charging air and fuel fluid into the associated engine may be altered by the throttle means in the one form to thereby effect power of the associated engine and thus also flow of exhaust gas to the turbine of the charging unit. In the other form (FIG. 5) such throttle control is not essential as the charging unit is automatically governed by motor-generator unit 3 through a variable range of speed, but there may be adjustment of power in the form of FIGURE 5 by the throttle valve 46. In either form the major power effect upon shaft 1 and its rotors is produced by the flow of gases from the associated engine and the motor-generator unit 3 in either of its functions is necessarily effective only to produce, in the one function only some additional rotative torque to maintain the speed of shaft 1 at approximately the minimum speed limit as selected and in the other function is necessarily effective only to produce the amount of generation of electric current which will as added to the torque requirement for air compression, cause the necessary retardation effect.

Referring now to FIGURES 11 and 12, the diffusion chamber which receives air from the compressor 4 discharges, or may discharge air under a compression of say ten pounds, more or less, through the pair of discharge ports 105, and these ports are contemplated to be connected by any manifold means to the air intake ports of an associated engine, as will be described in connection with FIGURES 11 and 12. The annular nozzle chamber 17 of the turbine may receive exhaust gases from the associated engine by means of the ports 106 and it is contemplated that these ports will be connected by any manifold means to the gas discharge ports of the associated engine. The chamber 20 which receives exhaust gases from the turbine 5 discharges gases through an exhaust pipe 107 or a pair of exhaust pipes which will discharge to atmosphere.

I have shown eight mixture carrying pipes 79 as means for carrying the mixture of carrier air and fuel to the intake or entry into the cylinders of an eight cylinder engine, but it is contemplated that there may be any number of such pipes and there may be only one of such pipe this being in accordance with the construction of an associated engine.

The chambers 16, 17, and 20 (FIGURE 5) are contemplated to be connected with an engine by the ports 105, 106, 107a, respectively, the last named being the gas exhaust discharge. In FIGURE 5, there are shown two methods of discharging fuel into the air stream delivered to chamber 22, one through discharger 7, the other by nozzle 87 to chamber 84 from whence it is passed by the compressor 6 to chamber 22. It is contemplated that either method may be used without the other, as either will result in a well mixed fluid of carrier air and fuel. The metering plugs 82 may be used in either form, these merely adding to the facility of metering fuel, and variation of fuel metering by use of different sets of metering plugs with varying cross-section of metering apertures. Either form depends to an extent on the speed of rotation of shaft 1 for metering and discharging of fuel, but in the first form the pressure control contributes to that function, and in the second form the needle valves 46 and 88 contribute to that function as does also the ability for change of plugs 82 with different metering apertures, especially for use with different engine constructions.

FIGURE 11 is a diagrammatic illustration showing the application of my charging unit to an eight clyinder V type four cycle engine, the unit A being shown in much reduced scale and with omission of detail. The cylinders, shown by dotted lines, designated 109 have as usual engine pistons driving a crank shaft 108 the operating mechanism not being shown. Each cylinder 109 has the air intake passages 110, and all these receive fresh air by way of one of the two air manifolds 111, and each of the latter by their flanges 112 are bolted to the flanges 113 of unit A, so that the air manifolds receive the primary charging air from the air discharge ports 105 which discharge the air from the compressor 4, this air being at a charging pressure varying according to the operation. The gas exhausts from the cylinders 109 discharge by the exhaust passages 114, to the pair of exhaust manifolds 115 and these are by similar flanges (not shown) connected to unit A, so that the exhaust manifolds discharge exhaust gases to the ports 106 and thereby to the nozzle chambers 17 so that the exhaust gases are guided thereby radially inwardly into the turbine rotor 5 and pass by way of passages 41 and chamber 20 to exhaust pipes 107, drive the turbine rotor 5 in passage. Each cylinder intake passage 110 has delivery to it from one pipe 79 carrying the carrier air and admixed fuel, any appropriate nozzle means 116 discharging to the air in the intake passage 110 associated with the nozzle. Such nozzles 116 are contemplated to be any type thereof which will accurately permit flow, the flow being determined by apertures from each nozzle 116 which apertures are as nearly exactly equal in capacity for flow, at any pressure, as they may efficiently be. Thus each intake passage receives the mixture of air and fuel from the annular diffusion chamber 22 for admixture with the primary charging air in the passage.

FIGURE 12 is a diagrammatic illustration showing the application of my charging unit to an eight cylinder V type two cycle engine, the unit A being shown in much reduced scale and with omission of detail. Cylinders are designated 109 and have the usual pistons and cooperation of pistons and cranks of the crank shaft 108. In the case of this two cycle engine application, the carrier air and fuel are separately introduced to each engine cylinder 109 by valve-chambers 117 receiving the carrier air and fuel from the branch pipes 118, and thereby from the mixture manifolds 119 (two thereof), and the latter are connected to the one discharge pipe 120 which receives the mixture from the annular diffusion chamber 22 of unit A. The valve chamber 117 have each an injection port 121, normally closed by valve 122, the latter being periodically opened by the cam lever or actuating lever 123 which is timed to actuate the valve (there being one for each valve 122) by any associated operating means (not shown), as in injection type engines, so that the air and fuel mixture from chamber 22 will enter the cylinder 109 at approximately the period immediately following the period in which the cylinder is charged (as in two cycle engines) with the primary air charge by means of the air inlet port 124 receiving air from the primary air manifold 111, so that this mixture air will not enter until approximately the time the exhaust port 125 is closed by the engine piston 126. The exhaust ports 125 (one for each cylinder 109) discharge by way of the exhaust gas manifolds 115 to the ports 106 of unit A and thereby nozzle chamber 17 through the turbine and to exhaust pipes 107 (or 107a).

In these applications of the unit A, either type of my unit A may be used with either application, the four cycle application or the two cycle application, the unit A performing in substantially the same way to discharge mixture fluid to the engine associated, and primary air under low pressure, and receiving exhaust gases for driving the turbine rotor 5 and thereby the other means of unit A.

While I have shown particular devices and combinations of devices in the illustration of my invention, I contemplate that other detailed devices and combinations of devices may be utilized in the realizaiton of my invention without departing from the spirit and contemplation thereof. It is contemplated that the motor-generator unit 3 may have a low charging capacity in intermediate speed between minimum and maximum limits. That is it may charge a battery at low charging rate before the maximum charging rate is reached at maximum speed limit.

What I claim is:

1. A multi-cylinder combustion engine having a plural number of cylinders each thereof having at least one piston reciprocable therein to drive an associated crank shaft means, exhaust conduit means from the cylinders and a plural number of charge intake means one for each cylinder and delivering thereto; a charging unit comprising; a rotor casing having formed therein three chambers, a primary air chamber, a secondary air chamber, an exhaust gas chamber, and having bearing means formed axially of the rotor casing and said chambers; a compressing means having a primary air compressor rotor rotatable in the primary air chamber and a secondary air compressor rotor rotatable in the secondary air chamber and arranged for compression of fluid at higher pressure than the pressure as produced by the primary air compressor rotor, a turbine rotor rotatable in said exhaust gas chamber, and a common drive means mounted for rotation by said bearing means and by which all said rotors are inter-engaged by the turbine rotor for rotation and without mechanical inter-connection with said crank shaft means; air entry means by which air flows to the compressing means; a discharge from the primary compressor rotor to each of said charge intake means; a discharge from the secondary compressor rotor to each of said charge intake means for distribution thereby to said cylinders; an intake to the turbine rotor to convey exhaust gases from said exhaust conduit means to the turbine rotor for driving it and a discharge from the turbine to discharge exhaust gases; a means delivering fuel into the air stream flowing through the secondary air chamber and therefrom to said cylinders through said charge intake means; a control throttle arranged in the air entry means by which air flows to the primary air compressor rotor and said discharge therefrom to said intake means for restriction of flow of air to said charge intake means; a control for restriction of fuel delivery from said means delivering fuel to the air stream; inter-engaging means for said two controls to effect a substantially constant ration of fuel flow to all air flow to said charge intake means.

2. A multi-cylinder combustion engine having a plural number of cylinders each thereof having at least one piston reciprocable therein to drive an associated crank shaft means, exhaust conduit means from the cylinders and a plural number of charge intake means one for each cylinder and delivering thereto: a charging unit comprising; a rotor casing having formed therein three chambers, a primary air chamber, a secondary air chamber, an exhaust gas chamber, and having bearing means formed axially of the rotor casing and said chambers; a compressing means having a primary air compressor rotor rotatable in the primary air chamber and a secondary air compressor rotor rotatable in the secondary air chamber and arranged for compression of fluid at higher pressure than the pressure as produced by the primary air compressor rotor, a turbine rotor rotatable in said exhaust gas chamber, an armature rotor arranged to be rotatable in an electric field means; a common drive means mounted for rotation in said bearing means and by which all said rotors are inter-engaged to be driven by said turbine rotor or said armature rotor for rotation independently of mechanical inter-connection with said crank shaft means; entry means for air and by which air flows to said compressing means; a discharge from the primary air compressor rotor to said charge intake means to distribute fluid thereby to said charge intake means; a discharge from the secondary air compressor rotor to each of said charge intake means to distribute fluid thereby to said charge intake means; a means delivering fuel to the air stream flowing through said secondary air chamber to said charge intake means; an intake means to the turbine rotor from said exhaust conduit means to convey exhaust gases to the turbine rotor; a discharge for said exhaust gases from said turbine rotor; a speed responsive means in operative inter-actuation with said armature rotor and common drive means and sensitive to speed thereof and current control means in responsive relation therewith to effect flow of electric current from a current supply to said armature rotor and electric field means when rotative speed of the common drive means is less than a minimum speed of rotation.

3. The device as defined in claim 2 and; said speed responsive means including also means to effect current flow and electro-magnetic excitation of said armature rotor and field means and therefrom to current storage means when said common drive means operates at a maximum speed for restriction of speed thereof.

4. The device as defined in claim 2 and; said speed responsive means including also means to effect current flow and electromagnetic excitation of said armature rotor and field means and therefrom to current storage means when said common drive means operates at a maximum speed for restriction of speed thereof, and means to adjust said speed responsive means in its operative inter-actuation relatively to the speed of said common drive means for modification to increase coincidently or decrease coincidentally the speed measuring relativity whereby the speed range in which said minimum or maximum control effects are accomplished is raised upwardly or lowered downwardly.

5. The device as defined in claim 2 and; a control throttle arranged to restrict flow of air by way of said primary air compressor rotor to said charge intake means; a control for restriction of fuel delivery to the air stream flowing from said secondary air chamber to said charge intake means; interengaging means for said two controls to effect a substantially constant ratio of fuel flow to all said air flow to said charge intake means.

6. A multi-cylinder combustion engine having a plural number of cylinders each thereof having at least one piston reciprocable therein to drive an associated crank shaft means, exhaust conduit means from the cylinders and a plural number of charge intake means one for each cylinder delivering thereto; a charging unit comprising—a rotor casing means having formed therein three chambers, a primary air chamber, a secondary air chamber, an exhaust gas chamber, and having bearing means formed axially of the rotor casing means and said chambers; a compressing means having—a primary air compressor rotor rotatable in the primary air chamber, a secondary compressor rotor rotatable in the secondary air chamber for compression of fluid at higher pressure than the pressure as produced by the primary air compressor rotor, a turbine rotor rotatable in the exhaust gas chamber, a common drive means mounted for rotation in said bearing means and by which all said rotors are inter-engaged for rotation by said turbine rotor independently of mechanical inter-connection with said crank shaft means; an electric field means formed in said rotor casing and an armature rotor arranged to be rotatable with said common drive means and to be rotatable within said field means and to be adapted to drive said common drive means and rotors; entry means for air and by which air flows to the compressing means for compression by the rotors; a discharge from the primary air compressor rotor to said charge intake means to distribute air to said charge intake means; a discharge from the secondary compressor rotor to said charge intake means to distribute fluid to said charge intake means; a means delivering fuel to the air flowing from said entry means for air to said secondary air chamber and therefrom to said charge intake means; an intake means to the turbine rotor from said exhaust conduit means to convey exhaust gases to the turbine rotor; a discharge for exhaust gases from said turbine rotor; a speed responsive means in operative inter-connection with said common drive means and sensitive to speed thereof and current control means in responsive relation therewith to effect flow of electric current from a current supply means to said armature rotor and electric field means when rotative speed of the common drive means is less than a minimum speed of rotation; the said speed responsive means and current control means and current supply means being further defined as means effecting also current flow in an alternative phase from said armature rotor to said current supply means when said common drive means operates at a maximum speed; the said speed responsive means being further defined as including means to adjust said speed responsive means and current control means in its operative inter-connection relatively to the speed of said common drive means for modification to increase coincidently or decrease coincidently the speed responsive relativity, whereby the speed range in which said minimum and maximum control effects are accomplished is raised upwardly or lowered downwardly.

7. The device as defined in claim 6 and: the said means delivering fuel comprising a pumping means in driven connection with said common drive means and secondary compressor rotor to at all times have a speed which is in constant ratio with the speed of rotation of the rotors, a fuel spraying means to receive fuel from said pumping means and discharge the fuel into the air stream flowing into and by said secondary air compressor to said charge intake means.

8. A combustion engine charging unit comprising: a rotor casing having formed therein three chambers, a primary air chamber, a secondary air chamber, an exhaust gas chamber, a bearing means formed axially of said rotor casing; a primary compressor rotor mounted in and rotatable in the primary air chamber; a secondary compressor rotor mounted in and rotatable in the secondary air chamber, a turbine rotor rotatable in the exhaust gas chamber, a common drive means by which all said rotors are mounted for rotation in said bearing means and inter-engaged for actuation by the turbine rotor; entry means for air and by which air flows for compression by said compressor rotors; air discharge port means receiving discharge from said primary air chamber and by which connection is made with charge intake means of an associated internal combustion engine; air and fuel mixture discharge port means from said secondary air chamber formed as a part of said rotor casing and by which connection is made with charge intake means of the associated engine; gas intake port means delivering to said exhaust gas chamber and formed as a part of said rotor casing and by which connection is made with exhaust gas conduit means of the associated engine; a fuel spraying means by which fuel is discharged into the air stream flowing by said secondary air chamber and as compressed by said secondary compressor rotor and to said air and fuel mixture discharge port means and thereby to the associated engine; means supplying fuel to said fuel spraying means; a control throttle interposed in the air stream flowing from said entry means for air and to said charge intake means and for restriction of flow of air to said charge intake means; a control for restriction of fuel delivery through said fuel spraying means to the air stream flowing from said secondary air compressor rotor and to said charge intake means; inter-engaging means for said two controls to effect a substantially constant ratio of fuel flow to the air flow to said charge intake means.

References Cited in the file of this patent
UNITED STATES PATENTS

| | | |
|---|---|---|
| 2,189,106 | Garve | Feb. 6, 1940 |
| 2,289,261 | Goodman et al. | July 7, 1942 |
| 2,401,188 | Prince | May 28, 1946 |
| 2,694,291 | Rosengart | Nov. 16, 1954 |